US006219948B1

(12) United States Patent
Bar-Yona

(10) Patent No.: US 6,219,948 B1
(45) Date of Patent: *Apr. 24, 2001

(54) DISPLAY UNIT

(75) Inventor: Itzchak Bar-Yona, Rosh Ha'Ayin (IL)

(73) Assignee: M.V.T. Multi Vision Technologies Ltd., Rosh Ha'Ayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/248,318

(22) Filed: Feb. 11, 1999

Related U.S. Application Data

(63) Continuation-in-part of application No. 09/089,337, filed on Jun. 3, 1998.

(30) Foreign Application Priority Data

Jun. 5, 1997 (IL) ........................................................ 121005
Feb. 12, 1998 (IL) ........................................................ 123276

(51) Int. Cl.[7] ........................................................ G03B 25/02
(52) U.S. Cl. ................................ 40/454; 40/453; 40/466; 40/470; 40/509
(58) Field of Search ............................ 40/454, 453, 466, 40/470, 509, 508, 436, 437

(56) References Cited

U.S. PATENT DOCUMENTS 3,613,277 * 10/1971 Rose et al. .......................... 40/437 X
3,686,781 * 8/1972 Calhoun, Jr. ........................ 40/454 X
5,007,191 * 4/1991 Shyu .................................. 40/574 X
5,276,987 * 1/1994 Honse ................................ 40/509 X
5,513,458 * 5/1996 Dehli ...................................... 40/470
5,724,758 * 3/1998 Gulick, Jr. ............................. 40/454
6,026,215 * 2/2000 Fantone et al. ...................... 345/102
6,078,424 6/2000 Morton .

FOREIGN PATENT DOCUMENTS 2-211437 * 8/1990 (JP) ....................................... 40/454

* cited by examiner

*Primary Examiner*—Terry Lee Melius
*Assistant Examiner*—Rodrigo J. Morales
(74) *Attorney, Agent, or Firm*—Oblon, Spivak, McClelland, Maier & Neustadt, P.C.

(57) ABSTRACT

There is provided a self-powered display unit for displaying at least two consecutively changing images to be viewed by a viewer, the unit including a housing having at least one window-like opening; at least one lenticular panel mounted in the housing behind the window-like opening, the lenticular panel having front and rear faces, the focal length of the lenses being substantially equal to their width; at least one displaceable, lightweight, substantially planar indicia carrier in the form of a replaceable film or sheet disposed inside the housing; an edge of the indicia carrier at least indirectly freely abutting against a cam; a high-efficiency, low-energy consumption, battery-powered DC drive including a DC motor coupled to the cam for periodically displacing the indicia carrier for a distance at least equalling the distance between two adjacent lenses of the panel, and a guide facilitating smooth reciprocating movement of the indicia carrier in juxtaposition with the rear face of the lenticular panel, whereby displacing the indicia carrier causes the constituent elements of one of the two or more images to be replaced by constituent elements of another one of the two or more images.

19 Claims, 9 Drawing Sheets

DISPLAY UNIT

The present invention is a continuation-in-part of U.S. patent application Ser. No. 09/089,337, filed Jun. 3, 1998, currently pending, the teachings of which are incorporated herein by reference.

FIELD OF THE INVENTION

The present invention relates to a display unit for displaying two or more consecutively changing images, more particularly to display units attachable to shelves in supermarkets or department stores, where their function is to effectively draw the attention of prospective buyers to a certain product during a time period of some days or weeks, and to a different product during the next time period, all according to the sales policies of the management and of competing suppliers.

BACKGROUND OF THE INVENTION

Over the years, supermarkets have established rather strict rules governing the dimensions of display units in order to ensure that they will not interfere with, or even endanger, people moving along the lanes delimited by the shelves, or that some of these units will not impair the visibility of other display units and, of course, of the products. Thus, the size of display units mounted in a direction perpendicular to the shelves is limited to a size of up to about 13×20 cm, while units mounted parallel to the shelves, and thus not projecting into the lanes, may be of a size of up to about 30×30 cm. None of these display units, however, may depend on external power sources, which would imply stringing of wiring along the shelves and the provision of outlets at fixed points, restricting flexibility.

Today the display units used are in the form of plastic frames attached to the shelves and carrying cards with what is intended to be a sales-promoting message. Over the years, however, the attention-commanding power of these passive displays has progressively waned and something more compelling is required to effectively attract the attention of today's sophisticated public.

DISCLOSURE OF THE INVENTION

It is thus one of the objects of the present invention to provide a dynamically active display unit which continuously exhibits two or more different, high-quality images in succession; a display unit based on optical principles that is inexpensive, lightweight and fully independent of external power sources, operating as it does for many months on a small battery, and having a picture or indicia-carrying card which is easily and rapidly exchanged in situ.

According to the present invention, the above object is achieved by providing a self-powered display unit for displaying at least two consecutively changing images to be viewed by a viewer, said unit comprising a housing having at least one window-like opening; at least one lenticular panel mounted in said housing behind said window-like opening, said lenticular panel having front and rear faces, the focal length of the lenses being substantially equal to their width; at least one displaceable, lightweight, substantially planar indicia carrier in the form of a replaceable film or sheet disposed inside said housing; an edge of said indicia carrier at least indirectly freely abutting against cam means; a high-efficiency, low-energy consumption, battery-powered DC drive means including a DC motor coupled to said cam means for periodically displacing said indicia carrier for a distance at least equalling the distance between two adjacent lenses of said panel, and guide means facilitating smooth reciprocating movement of said indicia carrier in juxtaposition with said rear face of the lenticular panel, whereby displacing said indicia carrier for said distance causes the constituent elements of one of said two or more images to be replaced by constituent elements of another one of said two or more images.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a general view of the display unit according to the invention;

FIG. 2 is a greatly enlarged, cross-sectional view of an array of linear, cylindrical lenses as used in the display unit according to the invention;

FIG. 3 represents an array of Fresnel-type linear lenses used for the same purpose;

FIG. 4 is a front view of a display unit according to the invention with the front part of its split housing removed;

FIG. 5 is a cross-sectional side view of the display unit of FIG. 4;

FIG. 6 shows the display unit of FIG. 4, in which also the front array of lenses has been removed, showing an indicia-carrying card, as well as the way in which the card is guided;

FIG. 7 is an enlarged view of the drive of the display unit of FIG. 4;

FIG. 8 is an enlarged view of the eccentric of FIG. 6;

FIG. 9 is an enlarged view of a different type of eccentric;

FIG. 10 represents a different way of guiding the card;

FIG. 11 represents a front view of a display unit in which the linear lenses extend in the vertical direction and the indicia-carrying card is therefore moved in the horizontal direction;

Figure 1:
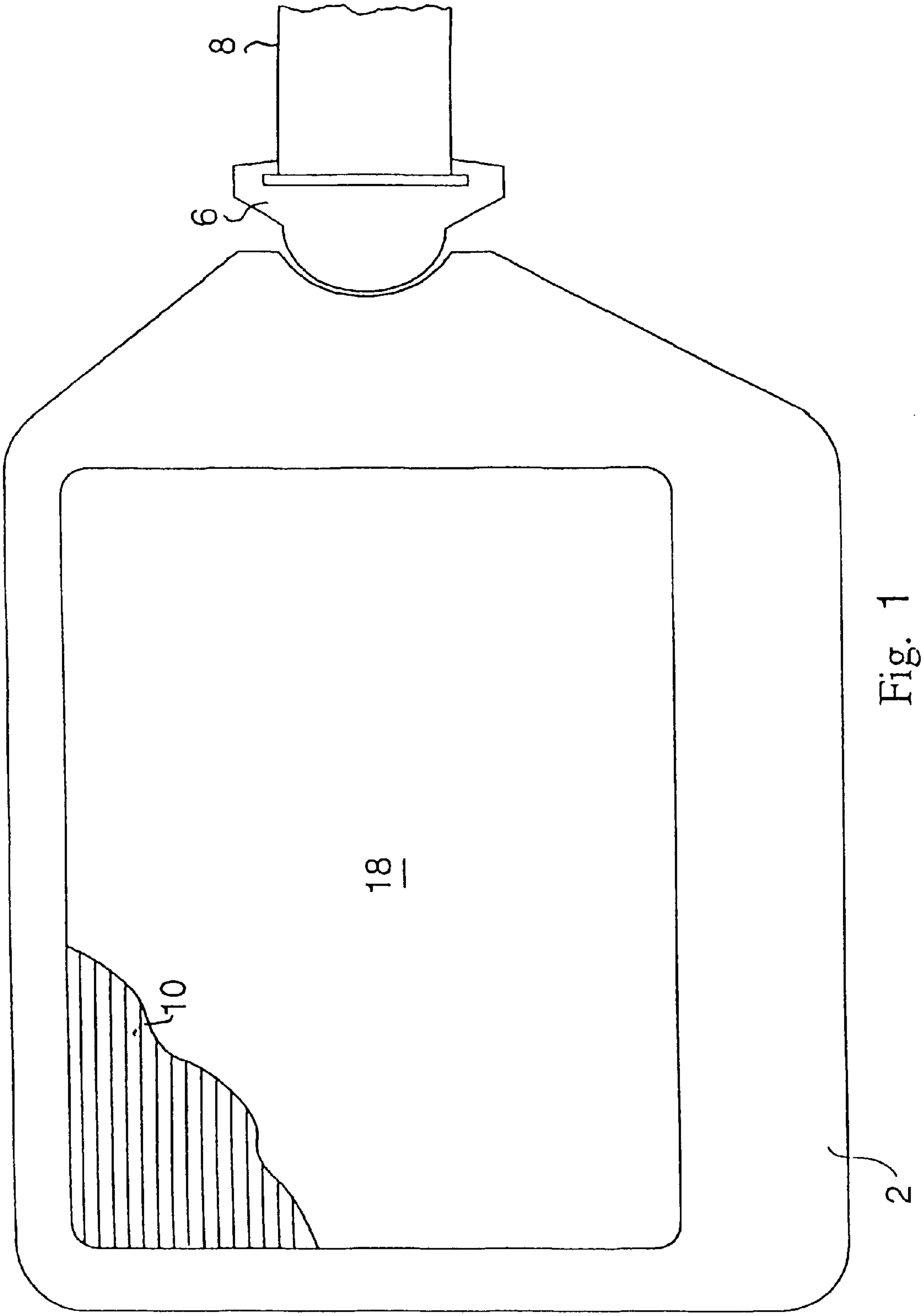
Figure 11:
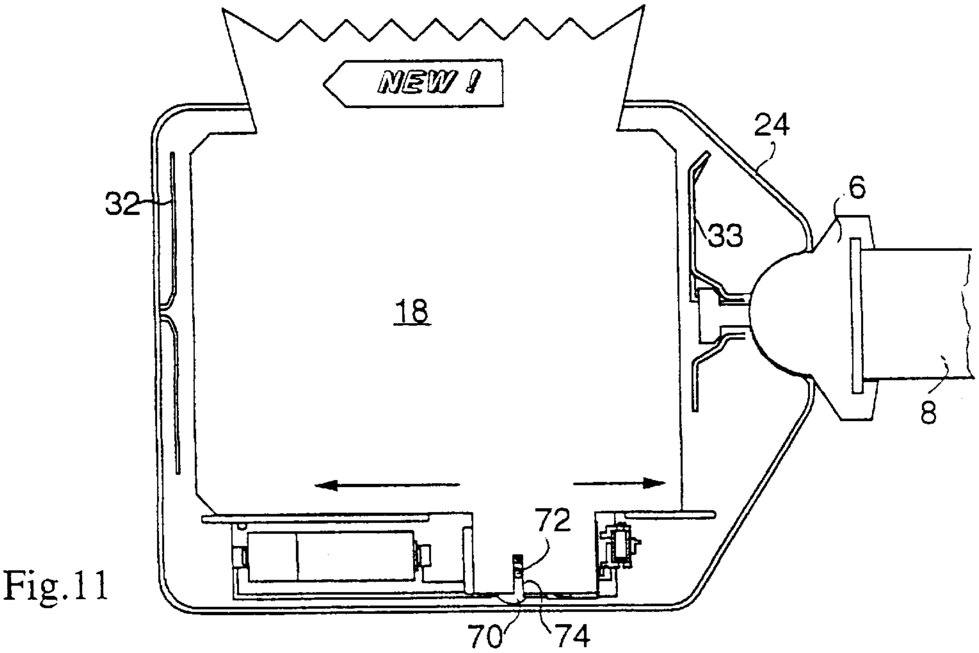
Figure 12:
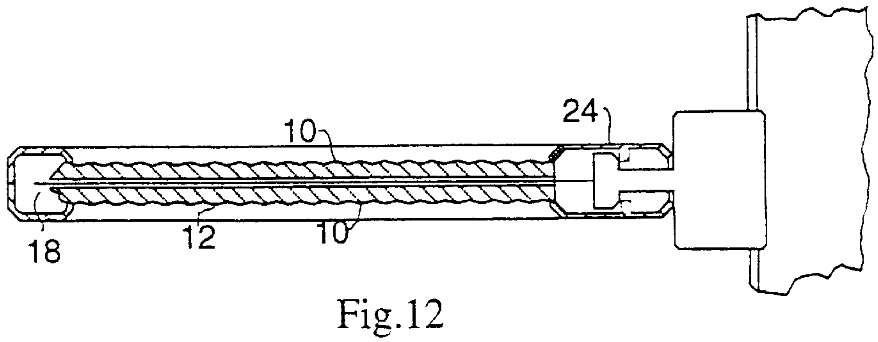
Figure 13:
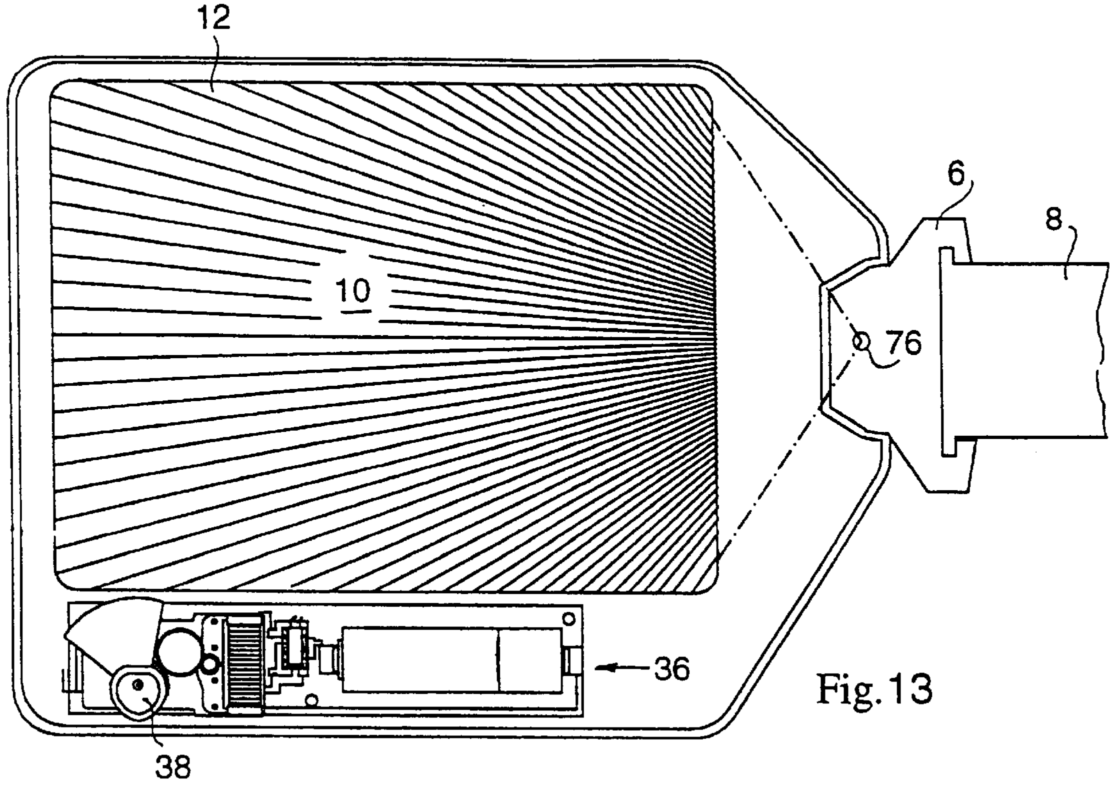
Figure 14:
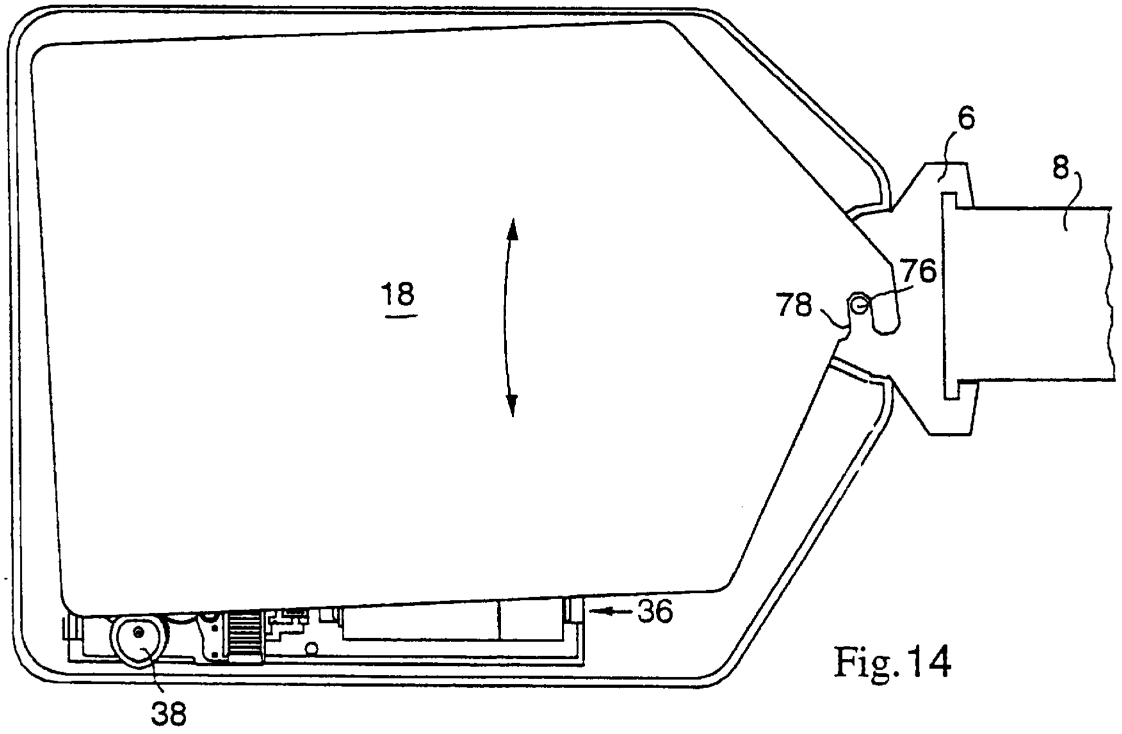
Figure 16:
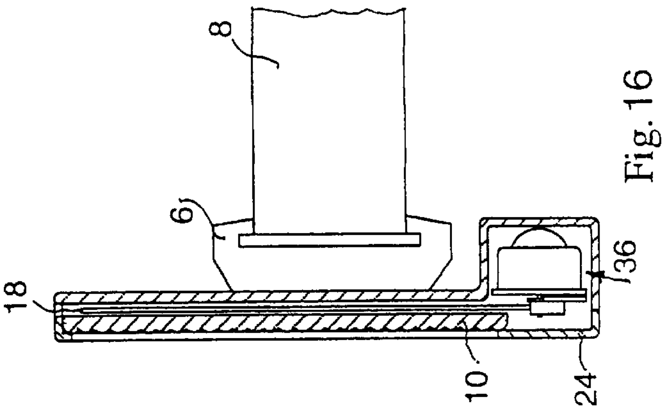
Figure 15:
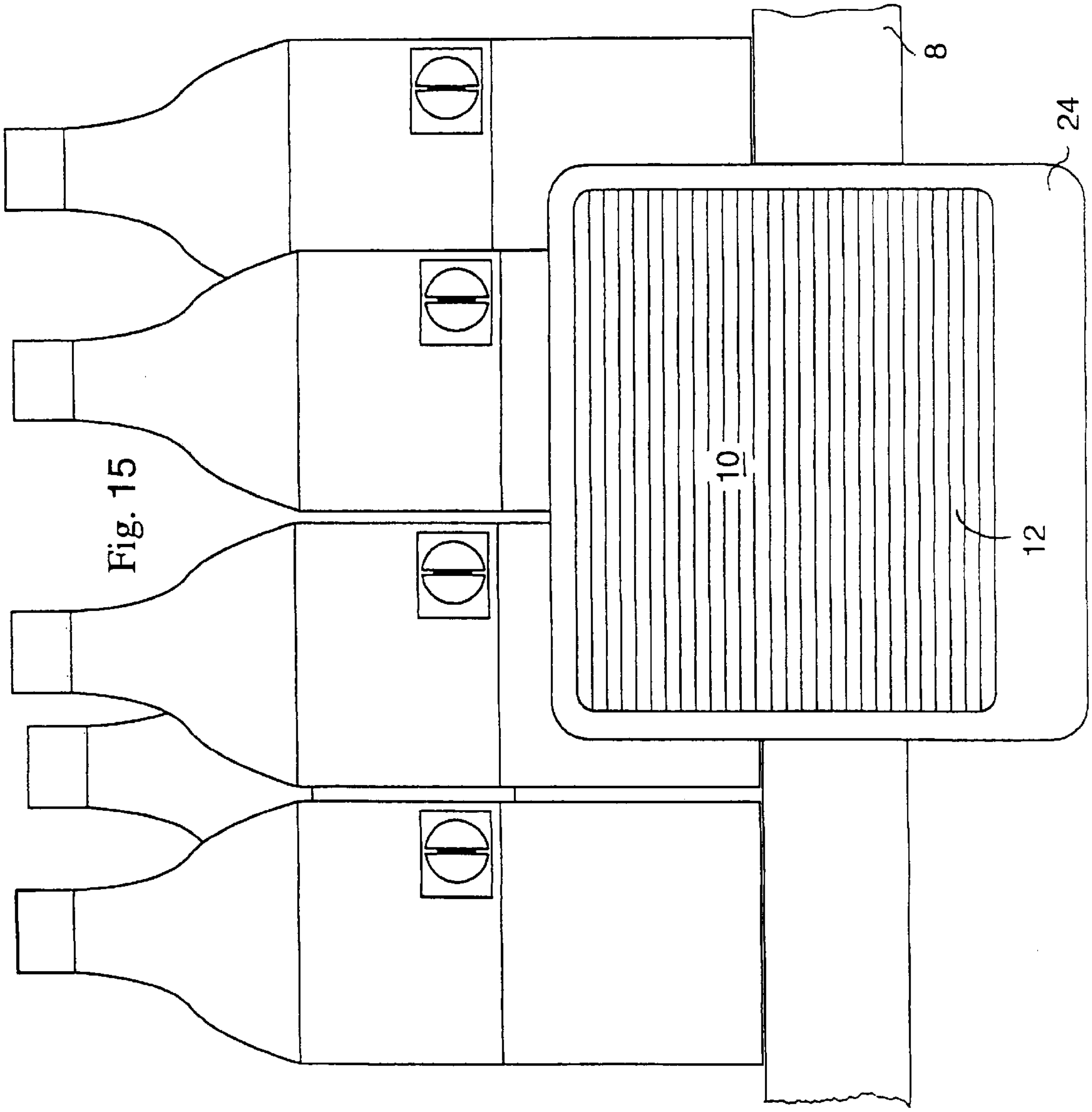
Figure 17:
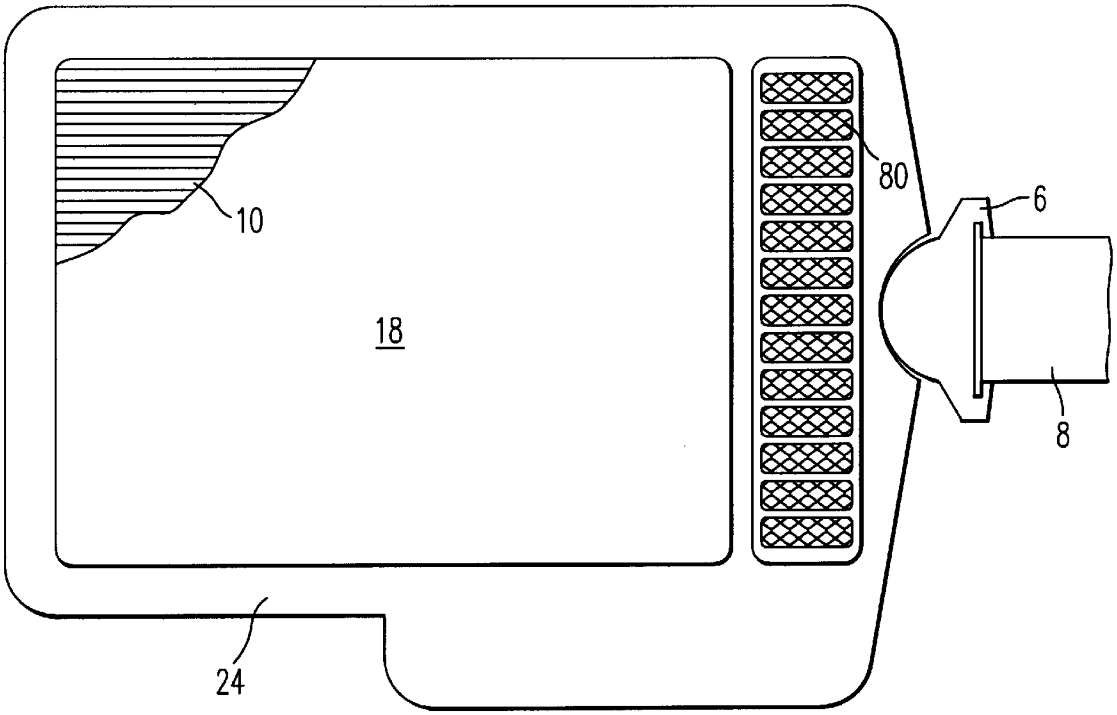
Figure 18:
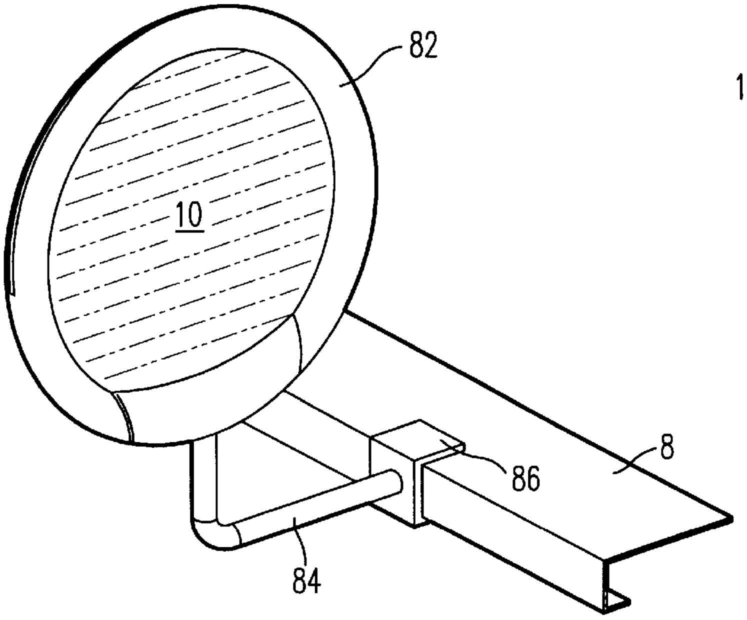
Figure 19:
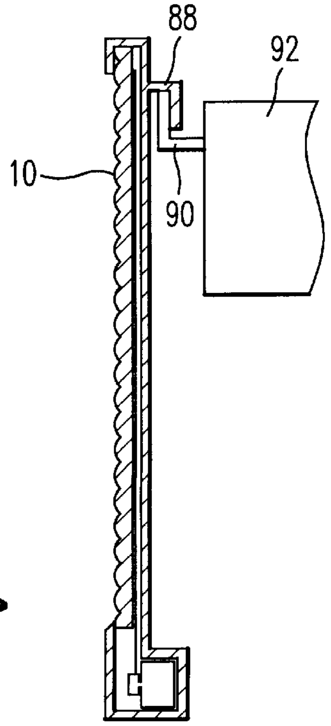

FIG. 12 is a cross-sectional view of the embodiment of FIG. 11;

FIG. 13 is a front view of an embodiment in which the lenses of the array converge towards a single point;

FIG. 14 illustrates the mounting of the indicia-carrying card of the embodiment of FIG. 13;

FIG. 15 is a front view of a display unit for mounting in parallel to a shelf;

FIG. 16 is a cross-sectional side view of the unit of FIG. 1;

FIG. 17 is a front view of an embodiment of the display unit including a bank of photocells;

FIG. 18 is a perspective view of a display unit of a different shape connected to a rail, and FIG. 19 is a cross-sectional, view of a display unit according to the present invention, attached to a wall.

DETAILED DESCRIPTION OF PREFERRED EMBODIMENTS

Referring now to the drawings, there is seen in FIG. 1 a general view of a display unit for attachment to shelves in a supermarket or the like, comprising a frame 2, a card or substantially planar indicia carrier 18 carrying the promotional message, and a fitting 6 for attachment to shelf 8.

The display unit according to the present invention includes the following features:

1) the message-carrying card (hereinafter, "the raster") is observed through an array of linear lenses, and 2) the raster carries (on each of its two faces, in the case of the display unit projecting from a shelf) two or more pictures or images, cut up in a per se known process into image constituent elements or frames, arranged in such a way that when the raster is moved in a direction perpendicular to the linear extent of the lenses, every lens shows first the image of one particular frame of one particular picture, the entire picture appearing across the array as the sum of the images of these individual frames. With continuing movement, the collective images of the frames of a second picture are seen, and so on.

It should be understood that the term "picture" used herein is intended to include every type of representation: pictorial, graphic or textual.

Rasters 18 can be made of any light, stable, non-hygroscopic material, such as a film, that can be printed upon, or that can be cemented or glued to a suitable substrate, such as an at least semi-rigid plastic material.

Figure 2:
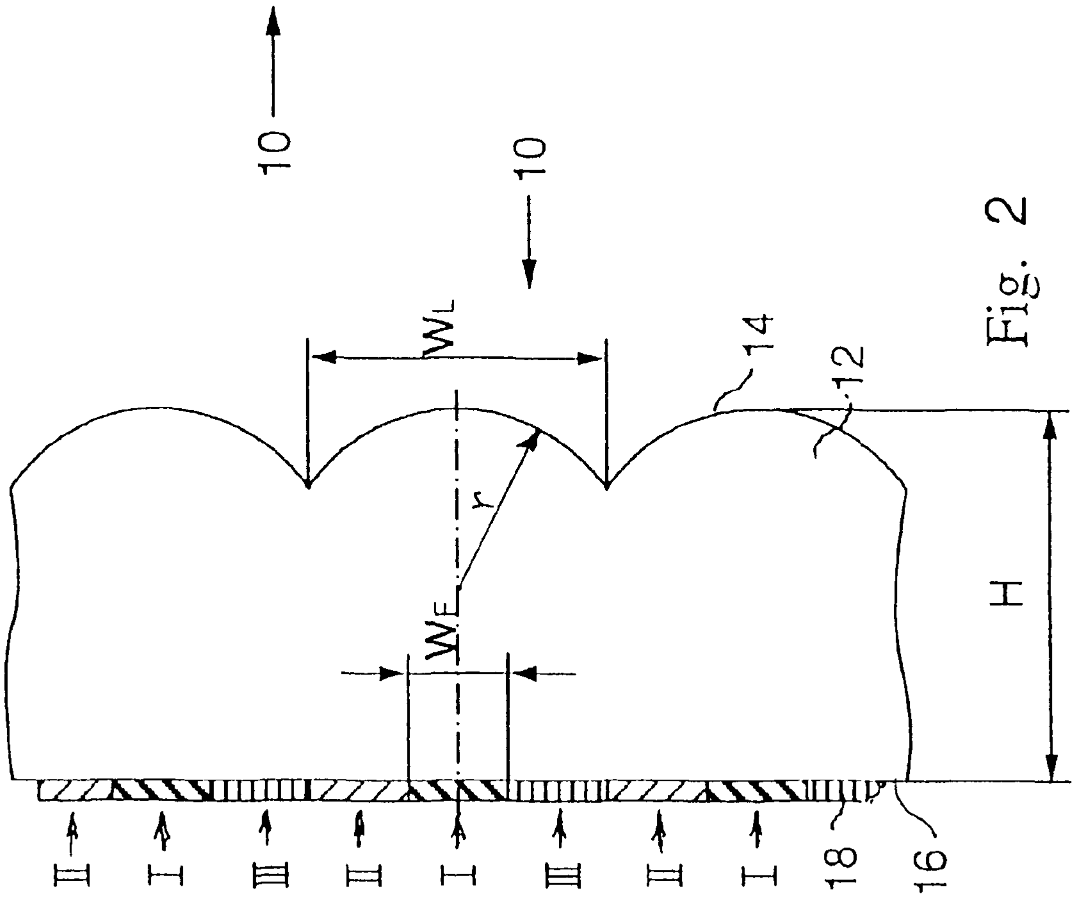

FIG. 2 represents a greatly enlarged, cross-sectional view of a portion of array 10, comprised of linear lenses 12 having a cylindrical geometry, i.e., in cross-section, their curvature consists of a circular arc 14. The rear surface 16 of the array is planar and is in free contact with raster 18. Optically speaking, each of lenses 12 acts as a magnifier, producing, at the instant depicted, an enlarged, upright, virtual image of frame I of one of the pictures. Seen are three frames, I, II and III of three different pictures to be shown in succession. The optical parameters of lenses 12 are such that the size of the virtual image of frame I, at the moment visible to the observer of that frame, will correspond to the width $W_L$ of lens 12, with the relationship of width $W_L$ to width $W_F$ of frames I, II or III being expressed by $W_L = W_F \cdot n$, where n signifies the number of different pictures to be shown on one raster face. Radius r of the lens curvature and the thickness H of array 10 are also functions of the above conditions. Favorable results were obtained with $W_L$=2.4 mm, $W_F$=0.8 mm, n=3, r=2.4 mm and H=4 mm.

Figure 3:
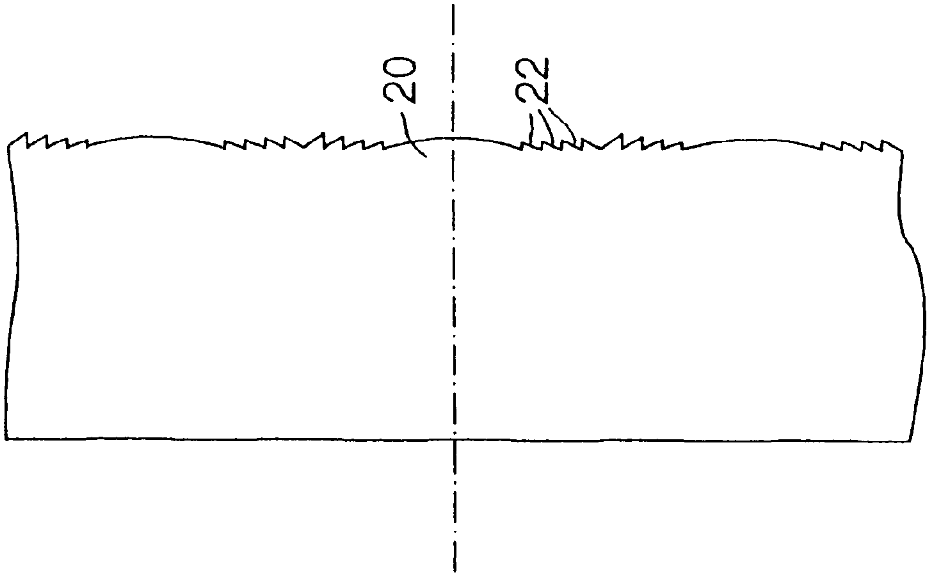

While arrays of the above-described type are quite easy to produce, certain lighting conditions are liable to produce highlights and glare which may interfere with the visibility of the picture. The similarly undesirable effect of a ruled surface may also be produced by the lines created where the curvatures of adjacent lenses intersect. A solution to this problem is provided by the array of lenses represented in FIG. 3. These arrays are constituted by substantially coplanar, advantageously integral groups of linear lenses of a cross-section conforming with the cross-section of Fresnel lenses, each group consisting of a central, substantially cylindrical lens 20, flanked by a number of quasi-prismatic linear lenses 22 ("quasi" because, strictly speaking, the slanting surfaces of these prisms are parts of cylindrical surfaces). Because of the absence of uninterrupted polished surfaces, highlights and glare are largely avoided, as is the ruling effect.

Figure 4:
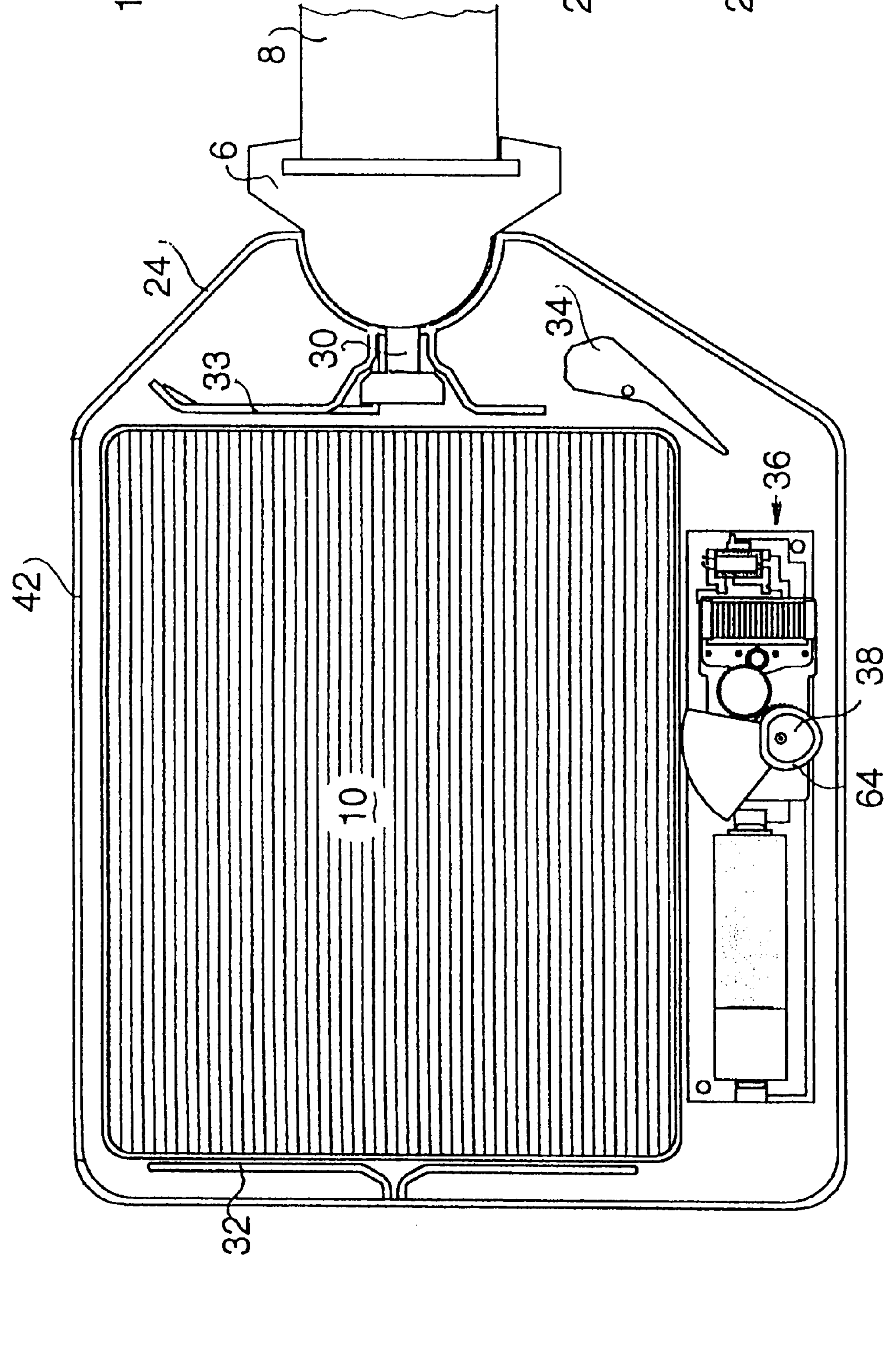

FIG. 4 is a front view of a first embodiment of the display unit according to the invention, with the front part of its split housing removed. Housing 24 is shown, advantageously made of a rigid plastic material and having lateral sides. Each of the halves of split housing 24 is provided with a window-like opening 25 (clearly shown in FIG. 5), behind each of which there is mounted a lens array 10 of the type shown in FIG. 2. Two arrays 10 are required in this embodiment, with raster 18 located between them with minimal clearance, as this embodiment of the display unit is intended to be observable from both sides.

A fitting 6 facilitates attachment of the display unit to shelf 8. Fitting 6 is connected to housing 24 via a flexible, headed pin 30 which prevents damage to the unit when it is accidentally bumped by a passing customer.

Further seen are guide rails 32, 33 which facilitate the introduction of raster 18 into housing 24 and guide the raster during its reciprocative movement. The guide means further comprises a gravity-biased finger 34 pivotably attached to the interior of the housing.

Figure 7:
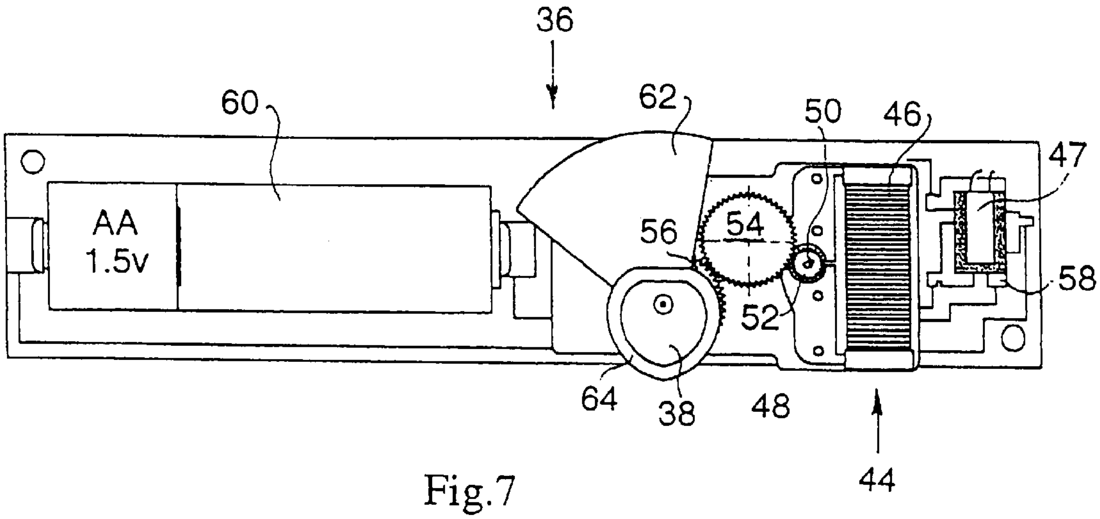

Drive unit 36 is accommodated in the lower, wider portion of housing 24, advantageously mounted on a PC-board and shown to better advantage in FIG. 7. The end effector of drive unit 36 is an eccentric 38 on which raster 18 rests. When eccentric 38 rotates, the raster rises and falls with the curve of eccentric 38, with which it is coupled by gravity.

Also shown is the rear part of split housing 24, with raster 18 in position and resting on eccentric 38. It is clearly seen that the point of support of raster 18 is off-center relative to its center line, and that the weight of raster 18 will produce a tilting moment in the counterclockwise direction (Arrow A). This tilting moment, in its turn, will result in a force vector B that presses at least the upper part of the edge of raster 18 against guide rail 32. Another vector C is produced by the weighted finger 34. Together, vectors B and C ensure that raster 18 always maintains contact with guide rail 32.

Figure 6:
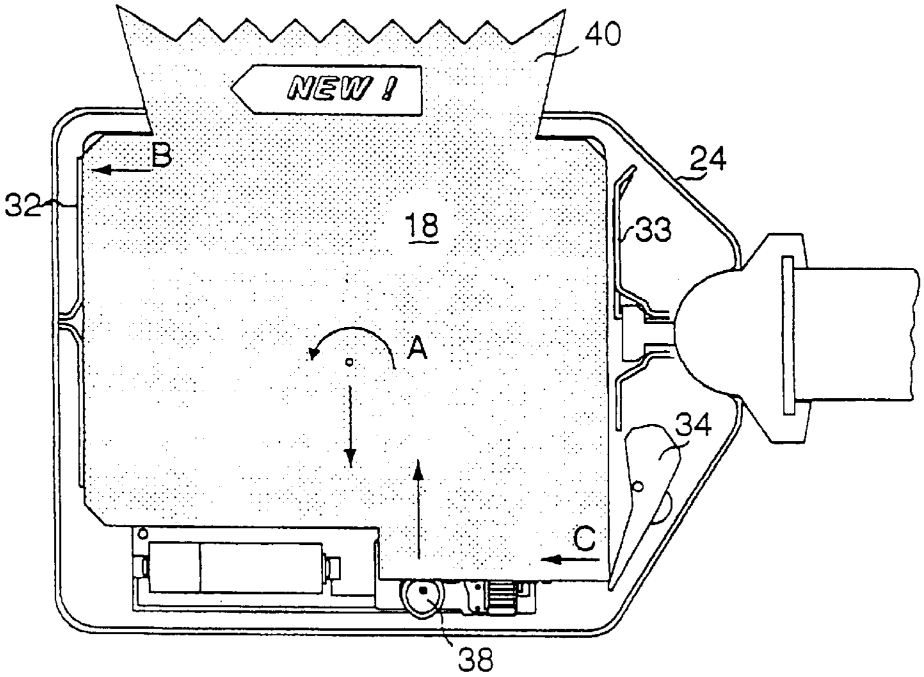

FIG. 6 also shows how easy it is to replace rasters 18 for a change of message: All one has to do, is to grip raster 18 by its projecting portion 40, pull it out of slot 42 and slide in a new raster 18, without having to take apart housing 24.

It is further seen that raster 18, when fully inserted into housing 24, does not touch guide rail 33, which assists only during the insertion of the raster. Low-friction sliding of raster 18 during operation is therefore ensured, in spite of possible dimensional instability due to the effects of changes of temperature and humidity. It is because of these changes in temperature and humidity that the apparently simple solution to the guidance problem, namely guide rails 32 and 33 with minimal clearance only, is not acceptable, because of the possibility of jamming under certain conditions.

FIG. 7 is an enlarged view of drive unit 36 of the display unit according to the invention. There is shown a stepping motor 44 mounted on a PC-board, comprising an induction coil 46, an oscillator 47, an armature 48 and a rotor 50 coaxial with a small gear wheel 52, which drives eccentric 38 via further gear wheels 54 and 56. Rotor 50 rotates 180° for each impulse provided by oscillator 47. Drive unit 36 is the most critical component of the display unit and, as used for a promotional tool attached to shelves in supermarkets, it must meet several demands, some of them apparently contradictory:

1) it must be price effective, i.e., an inexpensive means for promoting a single product on the shelf;

2) it must be independent of an external power supply, thus enabling the unit to be attached anywhere along the shelves;

3) it must be very lightweight and be of a compact design, so as to fit (together with the battery) into the slim housing of the display;

4) it must have a special cam system, enabling actuation of the raster without any additional energy, except that required to overcome friction losses;

5) it must produce a torque large enough to lift raster 18, overcoming frictional resistance, yet 6) its power consumption must be low enough to permit it to uninterruptedly operate on one small battery for many months.

The above conditions (1), (2) and (4) are met by a specially designed drive means, utilizing electromechanical components. For example, actuation can be based on a monolithic timer, including chip No. 555, generating periodic impulses, or a quartz crystal actuator as usually used in movements for wall clocks. The torque developed in the cam, however, must not be less than 2 gcm. (Standard quartz movements are usually limited to 1 gcm only.) Also, for best effect, the speed must preferably be between 2 and 4 rpm, in order to produce the suitable visual changing effect of the raster.

Motor 44 of the drive unit 36 has thus been designed to include a capacitor 58. Being connected to the battery in parallel with the motor, capacitor 58 produces a delayed discharge, extending the duration of each of the electric impulses, thus enhancing the ability of the motor to develop a higher torque.

It will be appreciated that the jumping of the picture, resulting from the individual steps of motor 44, definitely enhances the attention-grabbing effect of the display.

Further seen in FIG. 7 is a counterweight 62 attached to, or integral with, eccentric 3 8 in such an angular position that, when raster 18 is about to be raised, counterweight 62 will assist motor 44 by producing a torque counteracting the torque produced by the weight of the raster.

Figure 9:
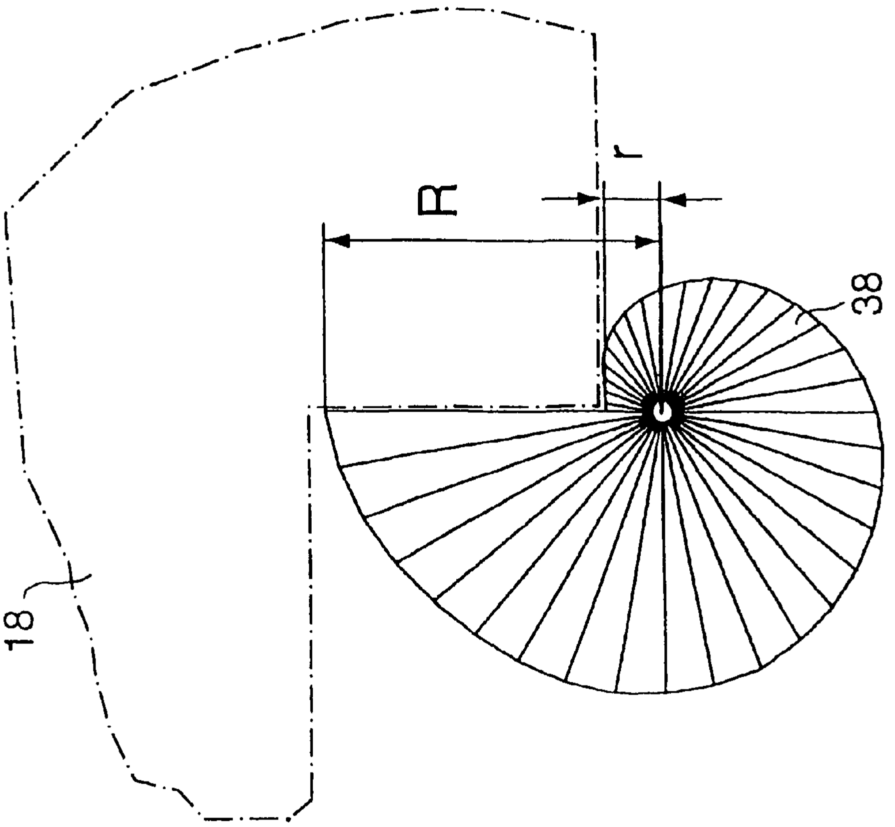
Figure 8:
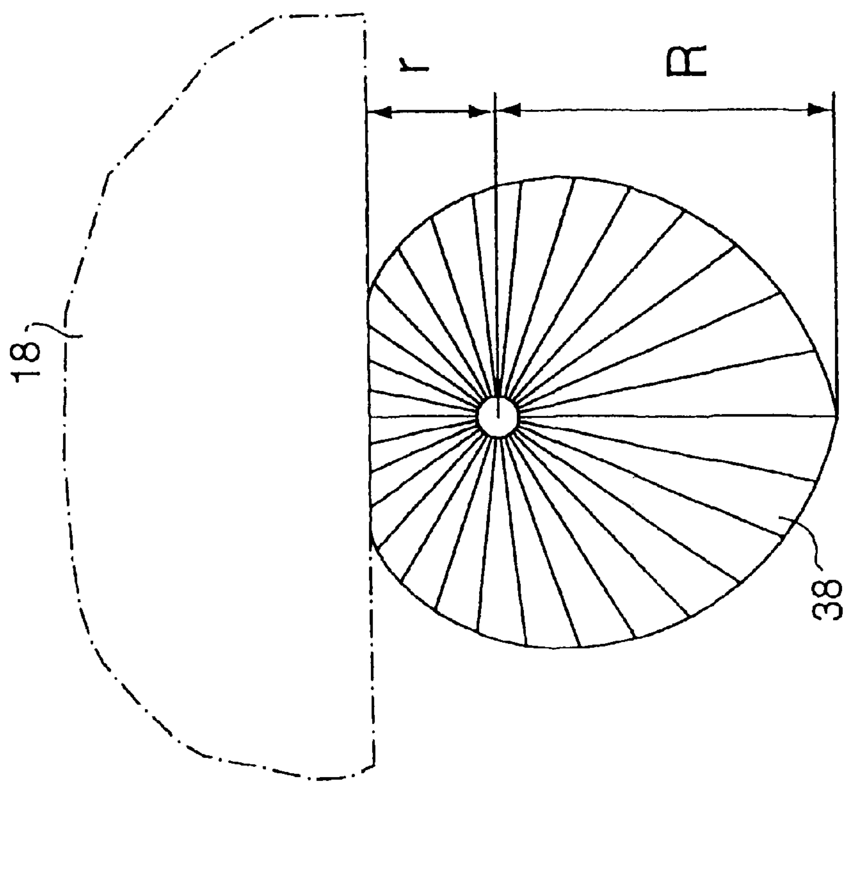

FIGS. 8 and 9 represent two different types of eccentrics 38. Both are based on the same curve, namely, the Archimedean spiral, which can be represented in polar coordinates by the equation $r=a\theta$, with a being a constant. In other words, r increases (or decreases) at the same rate as $\theta$. With both eccentrics, the total rise is R−r and equals the distance $W_L$ (see FIG. 2). (As a matter of fact, R−r is made slightly larger than $W_L$, to cause some degree of overlap to compensate for differences in the height of observers.) The difference between the two eccentrics resides in the fact that with eccentric 38 of FIG. 8, one full revolution of the eccentric produces one rise and one drop of raster 18, each taking the same length of time, while with eccentric 38 of FIG. 9, one revolution of the eccentric produces one rise that, given the same rotational speed of the eccentric, takes twice as long, while the drop takes zero time, i.e., it is instantaneous. In practice, given a raster with three different pictures I, III, with the eccentric of FIG. 8 the sequence of their appearance will be: rise-I; II; III; drop-III; II; I, while with the eccentric of FIG. 9, the sequence will be: rise-I; II; III; instantaneous drop; rise-I; II; III. In other words, if, for a particular publicity purpose, a certain sequence is of importance, the eccentric of FIG. 9 must be chosen.

It will be noted that eccentric 38 of FIG. 9 requires the provision of a step in raster 18.

Figure 5:
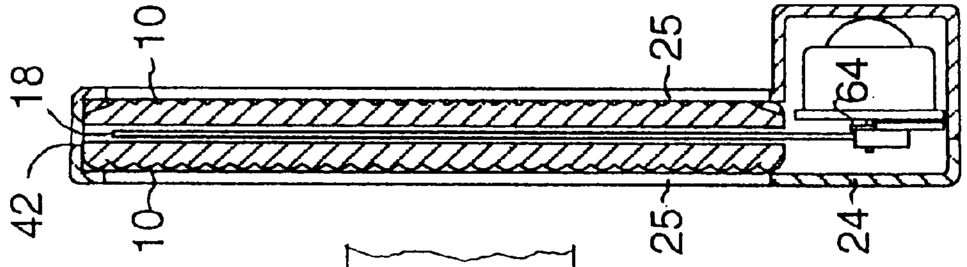

To prevent raster 18 from slipping off eccentric 38, the latter is advantageously provided with a rim 64 (FIGS. 4, 5, 7).

Figure 10:
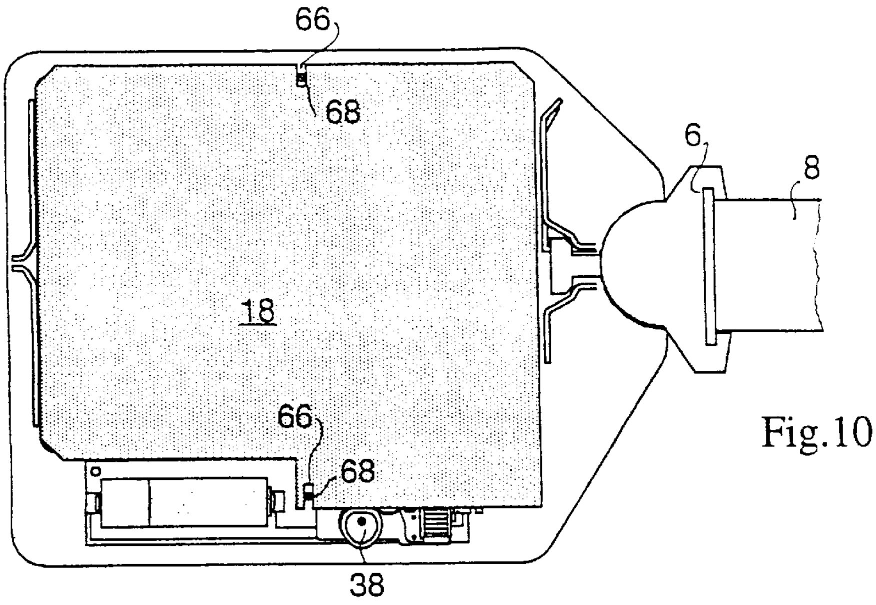

FIG. 10 represents a different way of guiding raster 18 during its reciprocative movement. Slots 66 are provided in the upper and lower edges of raster 18, and pins 68 are provided that fit slots 66 and are held with their ends in holes provided in both arrays 10 (FIG. 5). Pins 68 are advantageously made with stepped-down ends that fit the holes in arrays 10. The pin sections between the stepped-down ends can thus serve to define the distance between the two arrays 10. To replace raster 18, split housing 24 is opened and arrays 10 are separated.

FIGS. 11 and 12 represent a front view of half of split housing 24 and a top view, in cross-section, of a display unit in which lenses 12 of arrays 10 extend in the vertical, rather than in the horizontal, direction; raster 10 must consequently move in the horizontal direction. Eccentric 38 here takes the form of a plain disk 70, concentric with gear wheel 56 (FIG. 7), in which a pin 72 is eccentrically mounted, with an eccentricity half as large as the required movement of raster 18. The latter is provided with a slot 74 in which pin 72 rides.

FIGS. 13 and 14 illustrate an embodiment in which the lenses of array 10 converge towards a single point, rather than being parallel. One array of positive linear lenses is mounted in the housing behind the window-like opening, with the lenses taperingly covering from one side of the opening towards a point situated beyond an opposite side of the opening. In this embodiment, raster 18 performs a swiveling, rather than a translational, movement, with the picture elements suitably modified to allow for the convergence of the array lenses.

The frontal aspect of assay 10 is shown in FIG. 13, where it is seen that all lenses 12 converge towards a pin 76, which serves as a pivot for raster 18 (FIG. 14). The shape of raster 18 of this embodiment is clearly seen in FIG. 14, including a slot 78 whereby raster 18 hooks onto pin 76. The swivel motion of raster 18 is indicated by the double arrow, and is effected by eccentric 38 driven by drive unit 36 as discussed above. While the preparation of a raster of the type shown in FIG. 14 is more complex, its guidance is obviously simpler and more reliable.

FIGS. 15 and 16 illustrate an embodiment of the invention which is intended for mounting parallel to a shelf front. It is immediately evident that this embodiment requires only one lens array 10, as the rear side of the unit is not intended to be viewed. Also shown is fitting 6 (FIG. 16), whereby the display unit can be attached to shelf 8.

FIG. 17 illustrates an embodiment of the display unit which comprises, either on one or both sides, a bank of photocells of solar cells 80. As the working current of drive unit 36 is as low as 6 to 10 mA only, and given the ample illumination prevailing in supermarkets, drive unit 36 can definitely operate on, or at least be assisted by, these photocells.

FIG. 18 illustrates a display unit having a circular shape, including a circular frame 82, an arm 84 and a fitting 86 for connection to a shelf 8, a rail, or the like.

FIG. 19 illustrates another manner of attachment of a display unit, not necessarily to a shelf, but rather to a wall. For this purpose, the rear side of the display is furnished with a hook 88 and a compatible counterpart element 90 which is attachable to the wall.

While, in cross-section, the curvature of the linear lenses discussed herein was defined as circular arcs, these arcs could also be portions of other conic sections.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A self-powered display unit for displaying at least two consecutively changing images to be viewed by a viewer, said unit comprising:

a housing having at least one opening;

at least one lenticular panel having a plurality of lenses, said panel mounted in said housing behind said opening, said lenticular panel having front and rear faces, each of said lenses having a width, and the focal length of each lens being substantially equal to its width;

at least one displaceable, substantially planar indicia carrier in the form of a replaceable film disposed inside said housing;

an edge of said indicia carrier at least indirectly freely abutting against a cam;

a battery-powered DC drive including a DC motor coupled to said cam for periodically displacing said indicia carrier by a distance at least equalling the distance between two adjacent lenses of said panel; and a guide facilitating smooth reciprocating movement of said indicia carrier in juxtaposition with said rear face of the lenticular panel, wherein the displacement of said indicia carrier by said distance causes constituent elements of one of said two or more images to be replaced by constituent elements of another one of said two or more images.

2. The display unit as claimed in claim 1, wherein said drive is an electric motor fed by a standard battery accommodated in said housing.

3. The display unit as claimed in claim 2, wherein said electric motor is a stepping motor actuated by impulses generated by an oscillator.

4. The display unit as claimed in claim 2, further comprising a capacitor connected to said battery in parallel with said motor.

5. The display unit as claimed in claim 3, further comprising a capacitor connected to said battery in parallel with said motor.

6. The display unit as claimed in claim 1, wherein the lenses of said at least one lenticular panel are arranged to form one of horizontally extending and vertically extending linear lenses of a cross-sectional curvature conforming with a conic section.

7. The display unit as claimed in claim 1, wherein each of the lenses of said are linear lenses, of a cross-section conforming with the cross-section of a Fresnel lens.

8. The display unit as claimed in claim 1, wherein said cam includes a counterweight for producing a force at least partially counteracting the torque resulting from the weight of said picture carrier.

9. The display unit as claimed in claim 1, wherein said cam is an eccentric having an active surface.

10. The display unit as claimed in claim 9, wherein the active surface of said eccentric is part of at least one Archimedean spiral.

11. The display unit as claimed in claim 1, wherein said unit comprises two lenticular panels mounted in said housing in spaced relationship, said image carrier being slidably arranged between said two lenticular panels.

12. The display unit as claimed in claim 1, wherein said image carrier has two faces and carries elements of said at least two images on said two faces.

13. The display unit as claimed in claim 1, wherein said image carrier is made of a non-hygroscopic material.

14. The display unit as claimed in claim 1, further comprising a fitting, wherein said unit can be attached to a shelf in one of a perpendicular direction or a parallel direction thereto.

15. The display unit as claimed in claim 1, further comprising solar cells connected to said drive so as to enhance the electrical independence of the drive from electrical mains.

16. The display unit as claimed in claim 1, wherein said housing has lateral sides and said guide comprises rails extending along the lateral sides of said housing.

17. The display unit as claimed in claim 16, wherein said guide further comprises a gravity-biased finger to ensure that the image carrier maintains contact with said guide.

18. The display unit as claimed in claim 1, wherein said guide comprises slots in said image carrier and pins fitting said slots protruding from the interior of said housing, for guiding the image carrier in its movement.

19. A display unit for displaying two or more consecutively changing images, comprising:

a housing having at least one opening;

at least one array of positive linear lenses, said at least one array of lenses being mounted in said housing behind said at least one opening with said lenses taperingly converging from one side of said opening towards a point situated beyond an opposite side of said opening;

a pin located at said point and mounted in said housing;

a substantially planar image carrier having two faces, said image carrier carrying constituent elements of said two or more images on at least one of its two faces, said image carrier being adapted to engage, and swivel about, said pin; and a drive electrically independent of electrical mains, for periodically swiveling said image carrier about said pin by an angular distance at least equaling the angular convergence of vertices of adjacent lenses.

* * * * *